United States Patent
Nies et al.

(10) Patent No.: US 8,459,872 B2
(45) Date of Patent: Jun. 11, 2013

(54) BEARING WITH ALTERNATIVE LOAD PATH FOR EXTREME LOADS

(75) Inventors: Jacob J. Nies, Zwolle (NL); Bharat S. Bagepalli, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 1201 days.

(21) Appl. No.: 12/249,003

(22) Filed: Oct. 10, 2008

(65) Prior Publication Data

US 2010/0092120 A1 Apr. 15, 2010

(51) Int. Cl.
*F16C 21/00* (2006.01)
*F16C 33/58* (2006.01)
*F16C 29/06* (2006.01)

(52) U.S. Cl.
USPC .......................... 384/126; 384/513; 384/445

(58) Field of Classification Search
USPC ............... 384/126, 492, 505, 513, 523, 564, 384/569, 609, 618–619, 621, 445; 290/55, 290/44; 29/898.047, 898.059, 898.08
See application file for complete search history.

(56) References Cited

U.S. PATENT DOCUMENTS

| | | | | |
|---|---|---|---|---|
| 2,244,197 A | * | 6/1941 | Hessler | 384/569 |
| 3,814,488 A | * | 6/1974 | Rood | 384/619 |
| 4,906,113 A | | 3/1990 | Sague | |
| 5,165,804 A | | 11/1992 | Fisher et al. | |
| 5,441,350 A | * | 8/1995 | Fujita | 384/447 |
| 5,588,754 A | * | 12/1996 | Miller | 384/609 |
| 5,810,485 A | * | 9/1998 | Dublin et al. | 384/626 |
| 5,957,000 A | | 9/1999 | Pecorari | |
| 5,977,677 A | * | 11/1999 | Henry et al. | 384/102 |
| 6,682,220 B2 | * | 1/2004 | Kobayashi | 384/569 |
| 6,715,207 B2 | * | 4/2004 | Michioka et al. | 29/898.059 |
| 7,183,665 B2 | * | 2/2007 | Bywaters et al. | 290/55 |
| 7,217,039 B2 | * | 5/2007 | Baudelocque et al. | 384/624 |
| 7,360,310 B2 | * | 4/2008 | Bagepalli et al. | 29/898.08 |
| 8,174,144 B2 | * | 5/2012 | Nies | 290/55 |
| 2004/0041409 A1 | * | 3/2004 | Gabrys | 290/55 |

FOREIGN PATENT DOCUMENTS

JP 55149418 A * 11/1980

OTHER PUBLICATIONS

Vinicius Ubarana et al., "Extreme Wind Speed—Risk and Mitigation", GE reference document GER4277, Oct. 2007, pp. 1-4, http://www.gepower.com/prod_serv/products/tech_docs/en/downloads/ger4277.pdf.
K. Freudenreich et al., "The Load Level of Modern Wind Turbines According to IEC 61400-1", Journal of Physics: Conference Series 75 (2007)012075, 2007, pp. 1-11, vol. 75, IOP Publishing, http://www.iop.org/EJ/article/1742-6596/75/1/012075/jpconf7_75_012075.pdf?request-id=bb160f4d-cb96-4357-9390-248d346d5af1.

* cited by examiner

*Primary Examiner* — Marcus Charles
(74) *Attorney, Agent, or Firm* — James W. Pemrick; Ernest G. Cusick; Frank A. Landgraff

(57) ABSTRACT

A bearing is provided having a first race, a second race and one or more rolling elements. The bearing includes an alternate load path for extreme loads, and the alternate load path is formed between the first race and the second race. At least a portion of the extreme loads is diverted away from the rolling elements.

10 Claims, 7 Drawing Sheets

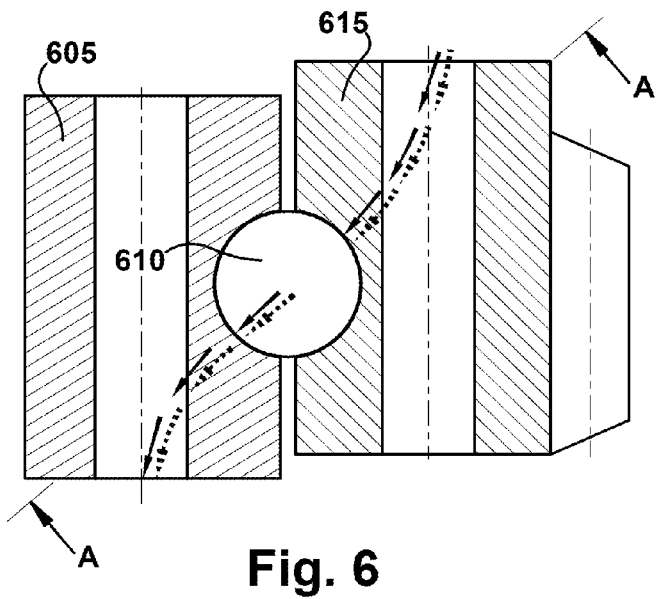
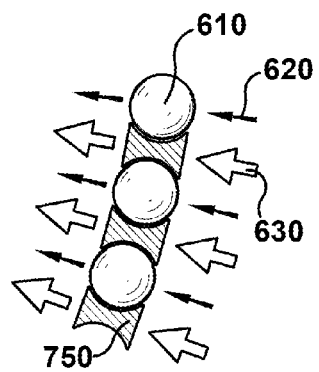
Fig. 6
Fig. 7
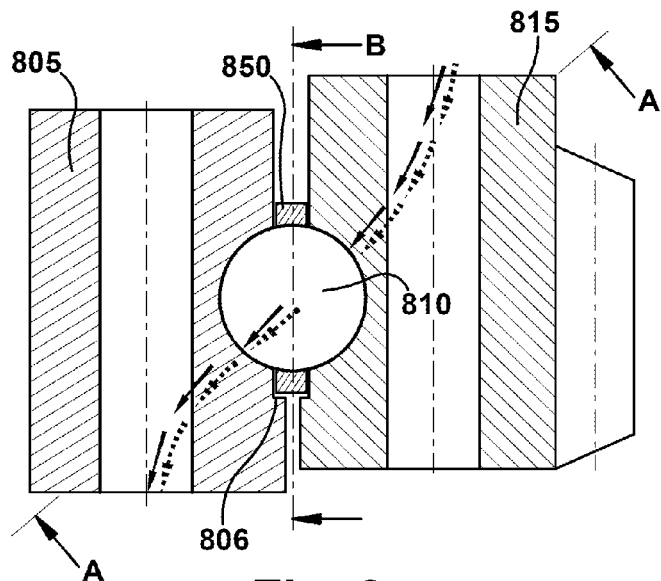
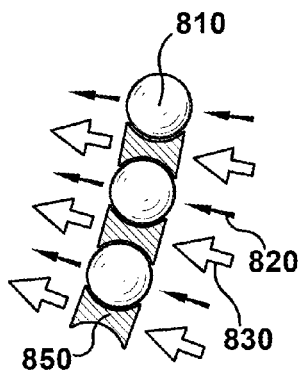
Fig. 8
Fig. 9

BEARING WITH ALTERNATIVE LOAD PATH FOR EXTREME LOADS

BACKGROUND OF THE INVENTION

This invention relates generally to bearings, and more particularly to bearings having an alternative load path for extreme loads.

Recently, wind turbines have received increased attention as environmentally safe and relatively inexpensive alternative energy sources. With this growing interest, considerable efforts have been made to develop wind turbines that are reliable and efficient.

Generally, a wind turbine includes a rotor having multiple blades. The rotor is mounted to a housing or nacelle, which is positioned on top of a truss or tubular tower. Utility grade wind turbines (i.e., wind turbines designed to provide electrical power to a utility grid) can have large rotors (e.g., 30 or more meters in diameter). Blades on these rotors transform wind energy into a rotational torque or force that drives one or more generators that may be rotationally coupled to the rotor through a gearbox. The gearbox steps up the inherently low rotational speed of the turbine rotor for the generator to efficiently convert mechanical energy to electrical energy, which is fed into a utility grid.

Wind turbines including direct drive generators eliminate the gearbox, and reliability problems associated with the gearboxes. However, in at least some known wind turbines, rotor bearings, pitch bearings, generator bearings and other bearings may prematurely fail. Because the bearings can be difficult to access and replace, failure of bearings can result in a lengthy and expensive repair process.

To facilitate reducing costs while optimizing turbine availability, bearing replacement and/or repair should be performed rapidly at the wind turbine site with a minimal infrastructure and skill set required. However, known bearings used in wind turbines generally require change-out at the factory or labor intensive and costly on-site repair.

BRIEF DESCRIPTION OF THE INVENTION

One aspect of the present invention therefore provides a bearing having a first race, a second race and one or more rolling elements. The bearing includes an alternate load path for extreme loads, and the alternate load path is formed between the first race and the second race. At least a portion of the extreme loads is diverted away from the rolling elements.

Another aspect of the present invention provides a bearing having a first sliding surface, a second sliding surface and zero or more sliding elements. The bearing includes an alternate load path for extreme loads, and the alternate load path is formed between the first sliding surface and the second sliding surface. At least a portion of the extreme loads is diverted away from the zero or more sliding elements.

BRIEF DESCRIPTION OF THE DRAWINGS

FIG. 6 is a cross-sectional illustration of a bearing according to another aspect of the present invention.

FIG. 7 is a view along section line A-A of FIG. 6.

FIG. 8 is a cross-sectional illustration of a bearing according to yet another aspect of the present invention.

FIG. 9 is a view along section line A-A of FIG. 8.

DETAILED DESCRIPTION OF THE INVENTION

Figure 1:
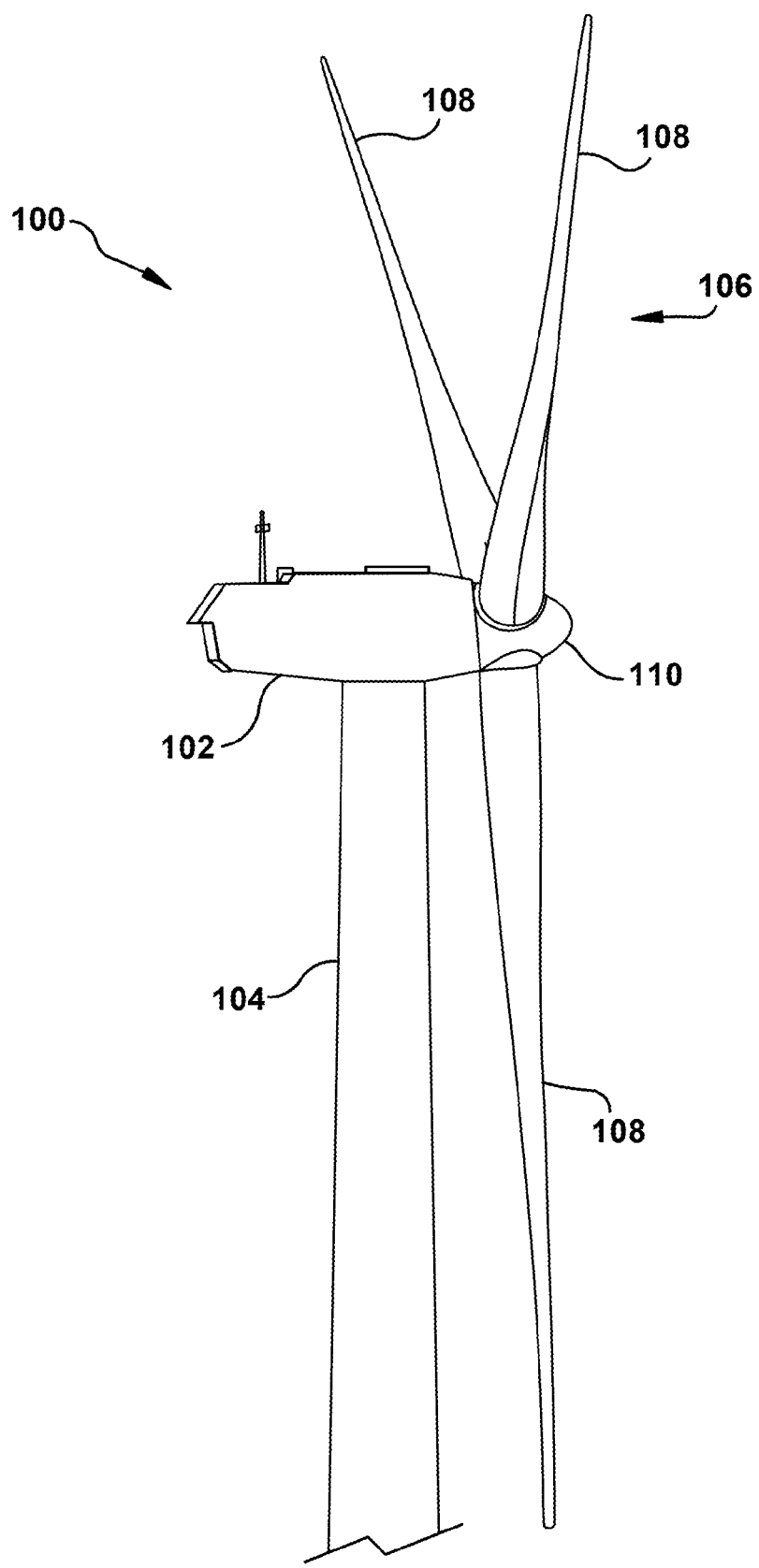
FIG. 1 is an illustration of an exemplary configuration of a wind turbine.

In some configurations and referring to FIG. 1, a wind turbine 100 comprises a nacelle 102 housing a generator (not shown in FIG. 1). Nacelle 102 is mounted atop a tall tower 104, only a portion of which is shown in FIG. 1. Wind turbine 100 also comprises a rotor 106 that includes one or more rotor blades 108 attached to a rotating hub 110. Although wind turbine 100 illustrated in FIG. 1 includes three rotor blades 108, there are no specific limits on the number of rotor blades 108 required by the present invention.

Figure 2:
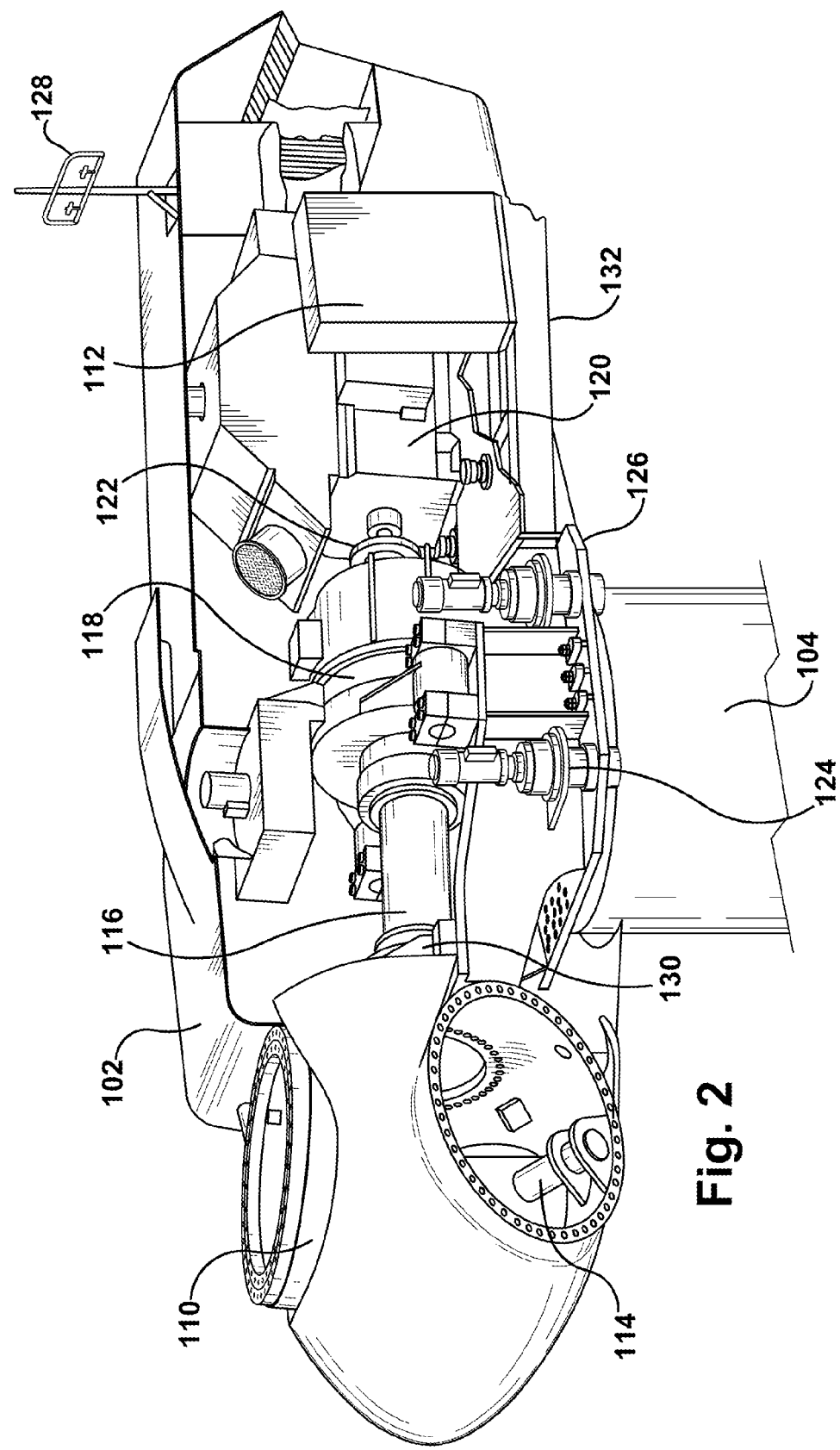
FIG. 2 is a cut-away perspective illustration of a nacelle of the exemplary wind turbine configuration shown in FIG. 1 and including a known geared drivetrain.

In some configurations and referring to FIG. 2, various components are housed in nacelle 102 atop tower 104 of wind turbine 100. The height of tower 104 is selected based upon factors and conditions known in the art. In some configurations, one or more microcontrollers within control panel 112 comprise a control system used for overall system monitoring and control. Alternative distributed or centralized control architectures are used in some configurations.

In some configurations, a variable blade pitch drive 114 is provided to control the pitch of blades 108 (not shown in FIG. 2) that drive hub 110 as a result of wind. In some configurations, the pitch angles of blades 108 are individually controlled by blade pitch drive 114. Hub 110 and blades 108 together comprise wind turbine rotor 106.

The drive train of the wind turbine includes a main rotor shaft 116 (also referred to as a "low speed shaft") connected to hub 110 via main bearing 130 and (in some configurations), at an opposite end of shaft 116 to a gear box 118. Gearbox 118 drives a high-speed shaft of generator 120. In other configurations, main rotor shaft 116 is coupled directly to generator 120. The high-speed shaft (not identified in FIG. 2) is used to drive generator 120, which is mounted on mainframe 132. In some configurations, rotor torque is transmitted via coupling 122. In configurations of the present invention, generator 120 is a direct drive permanent magnet generator.

Yaw drive 124 and yaw deck 126 provide a yaw orientation system for wind turbine 100. A meteorological boom 128 provides information for a turbine control system, which may include wind direction and/or wind speed. In some configurations, the yaw system is mounted on a flange provided atop tower 104.

Figure 3:
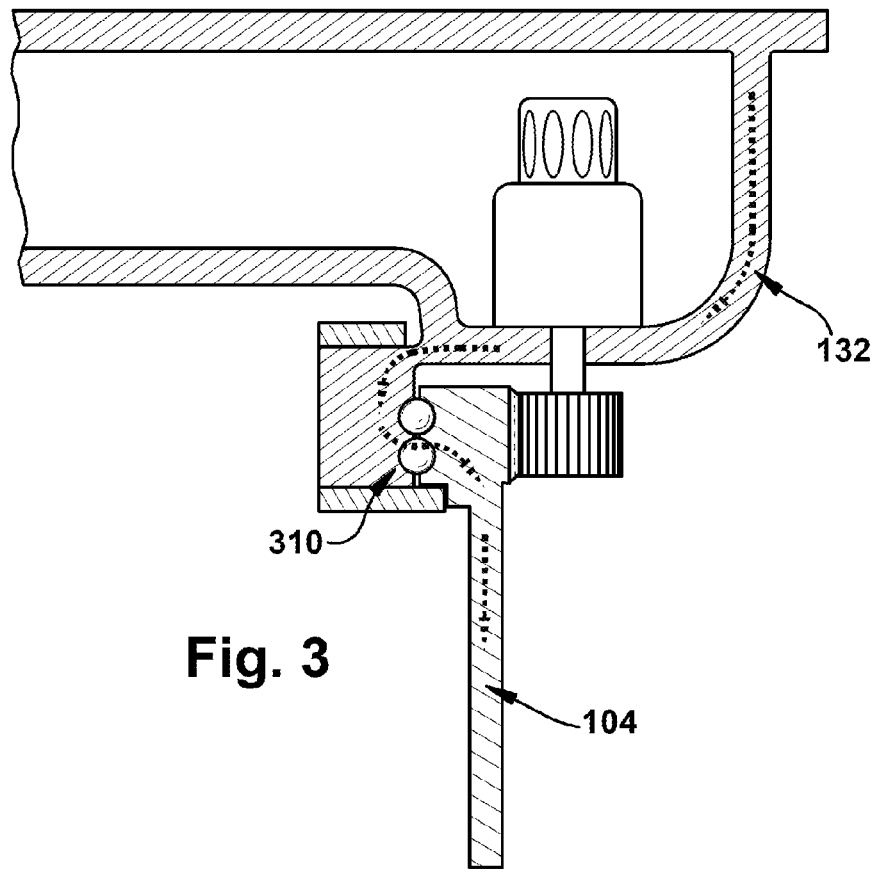
FIG. 3 is a sectional illustration of one known yaw bearing shown connected between the tower and bedplate of a wind turbine.

FIG. 3 illustrates one known bearing of the double row type. Bearings of this type can be used in the pitch or yaw system of wind turbines. This configuration is typically chosen to compensate for high loads that occur infrequently. The bearing 310 is located at the junction between tower 104 and the nacelle's bedplate or mainframe 132. The wind turbine 100 can be subject to occasional heavy gusts of wind. These gusts are typically of short duration, however they do exert extreme loads on the wind turbine. The wind can force the nacelle to tilt against one side of bearing 310. This force is transmitted from the main frame 132 through the yaw bearing 310 into tower 104. The double row bearing 310 has the advantage of being able to bear higher loads than known single row bearings, however, the cost of double row bearings is much greater.

Figure 4:
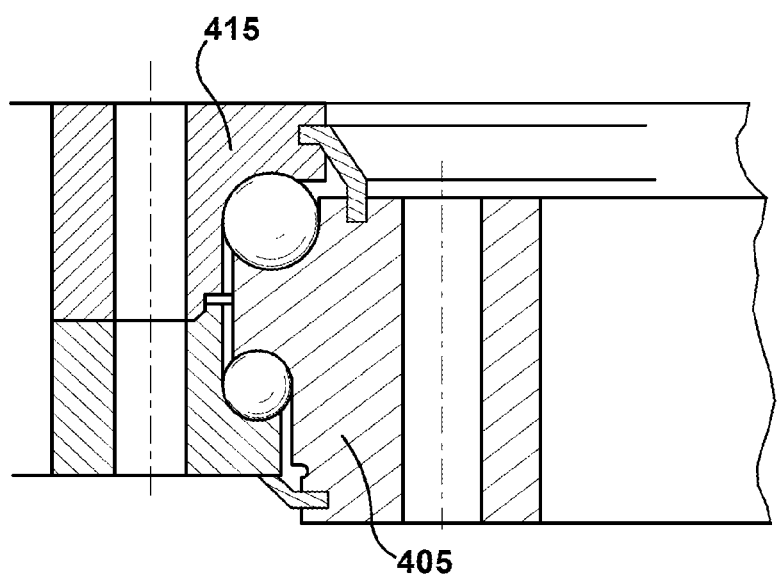
FIG. 4 is a sectional illustration of one known double roller bearing.

Another variation of a known double row bearing is shown in FIG. 4. In this bearing a portion of the inner raceway 405 extends between the bearings. The outer raceway 415 "wraps" around the bearings and the inner raceway extension. However, in both of the bearings of FIGS. 3 and 4, the load experienced between the races is transmitted through the bearings (e.g., ball or spherical bearings). For bearings subject to high loads, the use of a double or triple row bearing has been required. It would be advantageous if a lower cost, single row bearing could be designed to accommodate high loads as well.

Figure 5:
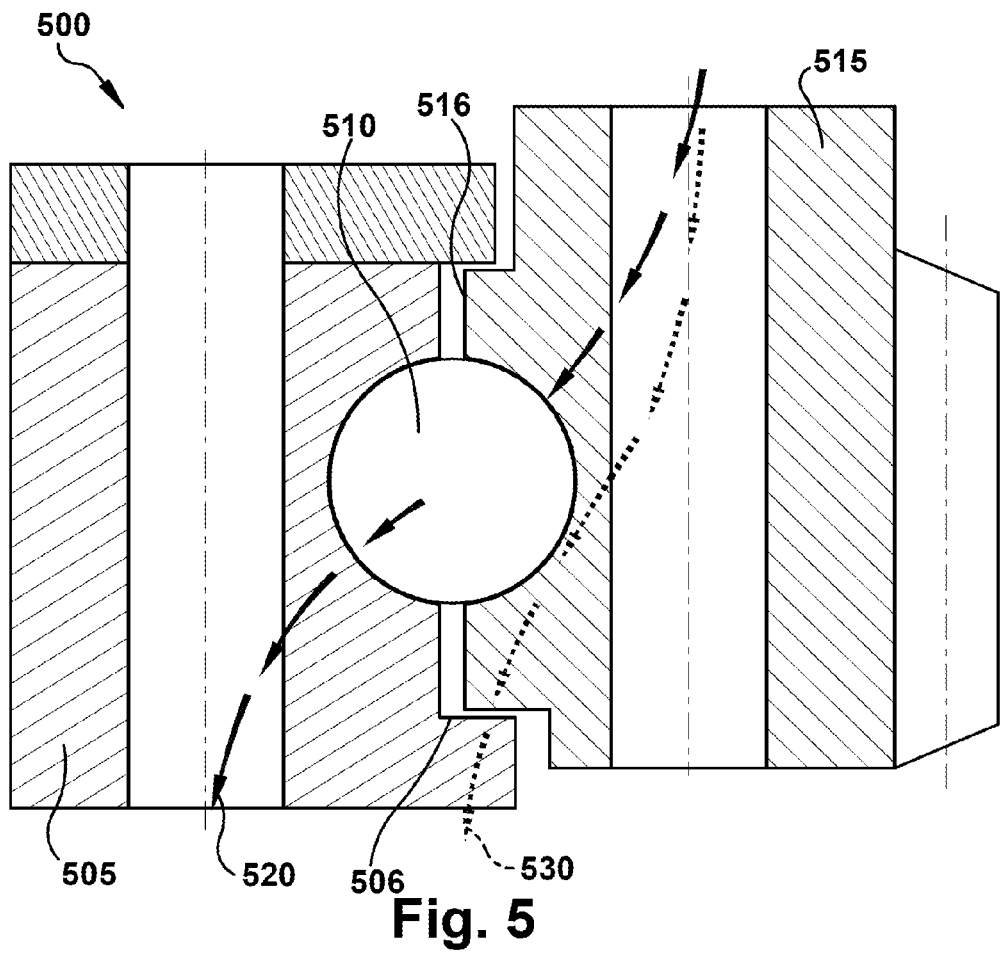
FIG. 5 is a cross-sectional illustration of a bearing according to one aspect of the present invention.

FIG. 5 illustrates a bearing according to aspects of the present invention. The bearing 500 can be used as the pitch bearing, yaw bearing or any other bearing in wind turbine 100. The inner race 505 includes a shoulder 506, and the outer race 515 contains a shoulder 516. The bearing 510 could be a ball, sphere, roller, tapered roller, barrel shaped roller, cylindrical element or other bearing means including sliding bearings, and is located between the inner race 505 and outer race 515.

The solid arrows 520 indicate the load path from the outer race 515 to the inner race 505 during normal or no load conditions. As can be seen, the load is transmitted from the outer race 515 through bearing 510 to the inner race 505. In such state, the bearing has a low friction torque typical for the bearing type. During extreme loading conditions the load path is changed to pass from outer race 515 directly to inner race 505, substantially bypassing bearing 510.

Wind turbine components are generally designed for two major criteria "extreme" and "normal" wind loads. Normal loads can be determined where there is a mean and some fluctuation around it. This produces "useful" power, and components are initially designed (screened) for fatigue and cumulative damage against this repetitive loading. In addition, components are also designed for extreme loads. One definition of extreme loads in the wind turbine field is defined as the 50-Year Gust (e.g., Ve50). Components have to withstand this "one time" each 50 years. For example, the 50-Year Gust could be the highest expected velocity of wind expected over a fifty year time period. Fatigue (i.e., repetitive loads) is not necessarily a criterion in this case. Different design rules can be used to address extreme loading scenarios, for example, that the ultimate tensile stress in the material should not be exceeded.

As defined in the IEC 61400-1 wind turbine design/safety standard, the largest wind speed to be considered is called "Ve50", which is the maximum gust over a 50-year return period for a 3-second averaging time. Extreme loads can occur during a Ve50 situation. Extreme loads may also occur when the alternate or extreme load path, according to aspects of the present invention, is at least partially utilized.

In a wind turbine application, normal loading could take place if the wind is at or below the cut-out speed and is flowing at a substantially constant rate past the blades. An extreme loading condition might occur when a sudden gust of wind appears and places a higher load on the wind turbine components than during a normal loading condition. Extreme loads are often of a shorter duration than normal loads. The term "extreme load" can be defined as any load in excess of normal operating load or any load that puts a large amount of stress on bearing 500. Typically, extreme loads can be caused by gusts of wind and/or wind speeds greater than the rated wind speed or cutout wind speed, or during a Ve50 situation.

The shoulders 506 and 516 of the inner and outer race are not in contact during normal operating conditions. However, during extreme loading conditions the inner 506 and outer 516 shoulders make contact with each other and effectively protect bearing 510 from excess deformation and/or damage. The dashed arrows 530 illustrate the load path during extreme loading. As one example, the blade of a wind turbine could be attached to the outer race 515 and the hub could be attached to in inner race 505. In another example the nacelle bedplate could be attached to inner race 505 and the tower could be attached to outer race 515. These examples are merely to illustrate a few locations where bearing 500 could be used in wind turbine 100, however, it is to be understood that bearing 500 could be used in any location where a bearing is desired.

FIGS. 6 and 7 illustrate another embodiment of the present invention. The alternate load path for extreme loads can also make use of existing hardware. The bearing spacing elements 750 can be manufactured with an outer diameter slightly smaller than the bearing's 610 diameter. During normal loading, the load path 620 is from the outer race 615 through the bearing or roller 610 to inner race 605. During extreme loads, the inner and outer races are forced closer to each other, and the spacing elements 750 become part of the extreme load path. The extreme load path 630 is comprised of the outer race 615, through the bearing spacing elements 750 to inner race 610. In this manner, the bearings or rollers 610 can be protected from damage due to extreme loads.

FIGS. 8 and 9 illustrate another embodiment of the present invention. In bearings with a cage, the cage can become a load-carrying member during extreme loads. Effectively, the cage 850 functions in similar fashion as the bearing spacing element of FIGS. 6 and 7. The bearing or rolling element 810 is at least partially contained within cage 850, and both bearing 810 and cage 850 are placed between the inner race 805 and outer race 815. During normal loads, the load path 820 is from the outer race 815 through bearing 810 to inner race 805. During extreme loads, the load path 830 is from the outer race 815 through cage 850 to inner race 805. Typically, the cage 850 can be comprised of a plurality of spacing elements connected together via one or more circumferential rings. Shoulder 806 can be placed on the inner race 805 (as shown) and/or on the outer race 815. The shoulder can be placed above and/or below the cage 850 as well.

Figure 10:
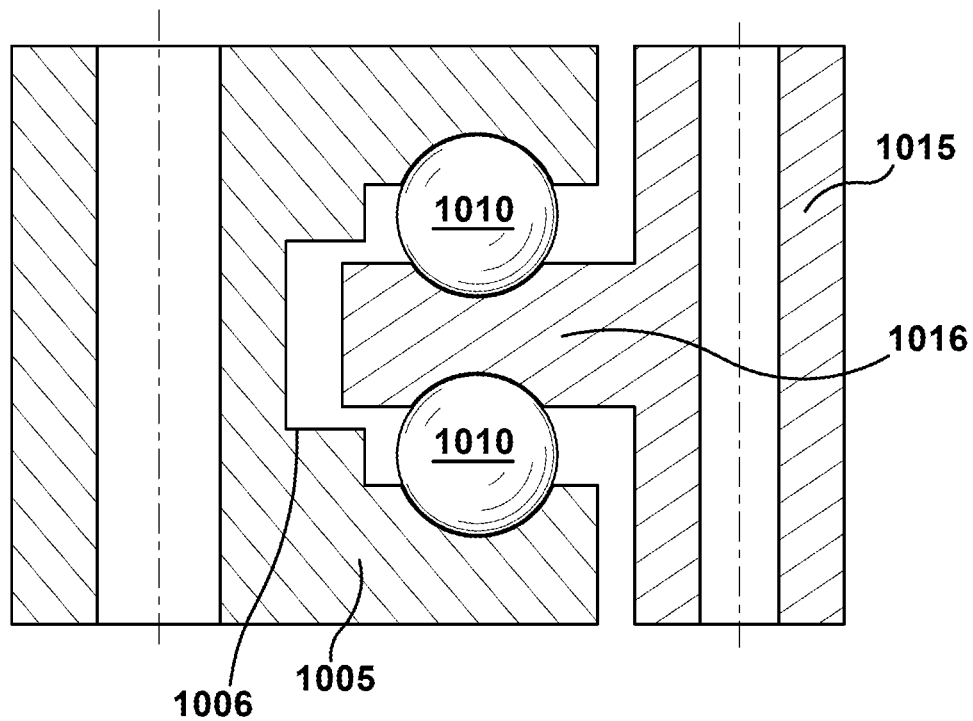
FIG. 10 is a cross-sectional illustration of a bearing according to a still further aspect of the present invention.

FIG. 10 illustrates another embodiment of the present invention, which is an improvement to the type of bearing illustrated in FIG. 4. Inner race 1005 incorporates a shoulder or pocket 1006. Outer race 1015 includes a projection 1016, which extends at least partially into pocket 1006. Two rollers 1010 are placed above and below projection 1016. During normal loads, the load path is from the outer race 1015 and projection 1016 through rollers 1010 to inner race 1005. During extreme loads, the load path is from the outer race 1015, projection 1016 through pocket 1006 to inner race 1005.

In additional aspects of the present invention, the alternate load path could be arranged to flow outside the bearing (e.g., through the yaw brake system of a wind turbine). Additional roller or bearing elements can be added above or below the race to further absorb extreme loads.

Test data was obtained on a 1.5 MW wind turbine, and the pitch bearing showed a deflection of about 0.7 mm to about 1.0 mm at extreme loads. Operating loads were in the range of about 1,200 kNm or less. As one example only, if the shoulders were spaced about 0.45 mm from each other, then the load on the ball and raceway system (i.e., the pitch bearing)

would be reduced by about half. It is to be understood that the shoulders could be spaced from each other by more or less than the amount in the previous example, and the spacing is determined by the requirements of the specific application.

The incorporation of alternate load paths for extreme loads in a bearing has many advantages. The size of the bearing can be reduced, and this translates into lower cost and reduced weight. Towers must support heavy loads, and reducing weight at the top of the tower or in the nacelle is highly beneficial. The bearing can also sustain extreme loads with a reduced rate of failure. Bearings that last longer save in maintenance and replacement costs, as well in avoidance of downtime for the wind turbine. The bearing, as embodied by aspects of the present invention, is also not limited to wind turbine applications. In fact, bearings with alternate load paths for extreme loads could be used in any application where bearings are subject to frequent or intermittent extreme loads. Aircraft engines and power generation equipment could also benefit from the bearings herein described.

The shoulders referred to in the description above are preferably enclosed within the lubricated zones of the bearing. In this way a clean contact is provided, preventing dirt to clog the narrow gap. When designed so, a shoulder contact can also be created outside the lubricated zone, accepting possible dirt clogging the gap and interacting during the higher operating loads. Alternatively, a double seal system may be applied where the first and inner set of seals keeps the lubricant in and a second set of seals keeps the dirt out.

Figure 11:
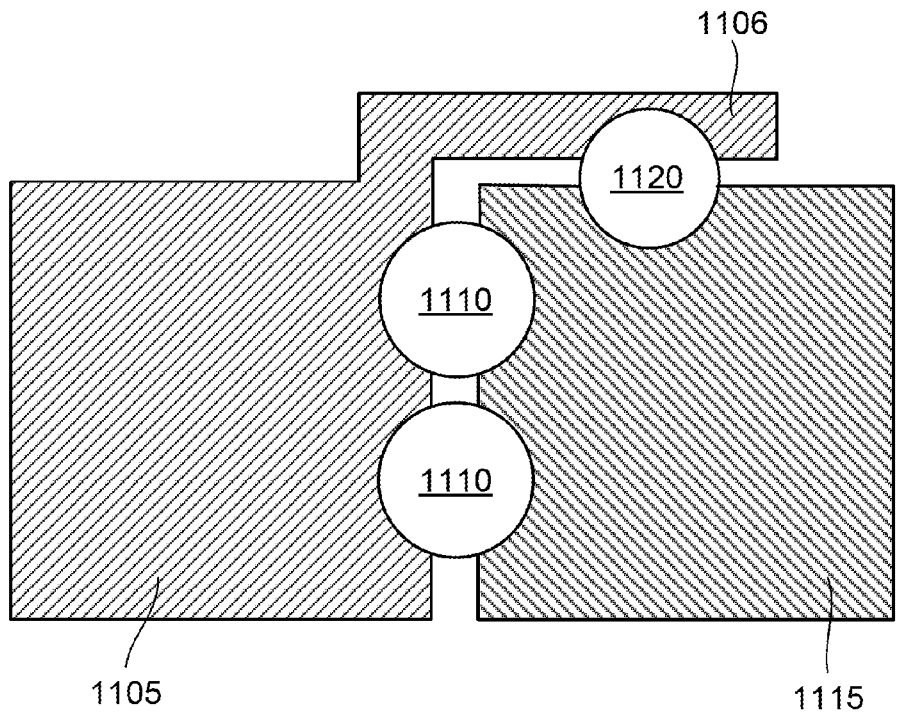
FIG. 11 is a cross-sectional illustration of a bearing according to another aspect of the present invention.

FIG. 11 illustrates another embodiment of the present invention, which incorporates an additional bearing or roller. A first race 1105 incorporates an extension 1106. Rolling elements 1110 are placed between the first race 1105 and the second race 1115. An additional series of rolling elements 1120 are placed between the first race extension 1106 and the second race 1115. During extreme loads, at least a portion of the extreme loads are diverted away from rolling elements 1110 and directed from extension 1106, through rolling elements 1120 to second race 1115. The rolling elements can be designed so, during normal operating load conditions, little or no load is transferred from extension 1106 through rolling elements 1120 to second race 1115. The rolling elements 1120 could be slightly undersized with respect to the cooperating races or a cage or spacing element could be incorporated as well. In other embodiments, the rolling elements could be designed to carry normal operating loads as well. The rolling elements 1120 could be a ball, sphere, roller, tapered roller, barrel shaped roller, cylindrical element or other bearing means including sliding bearings.

Figure 12:
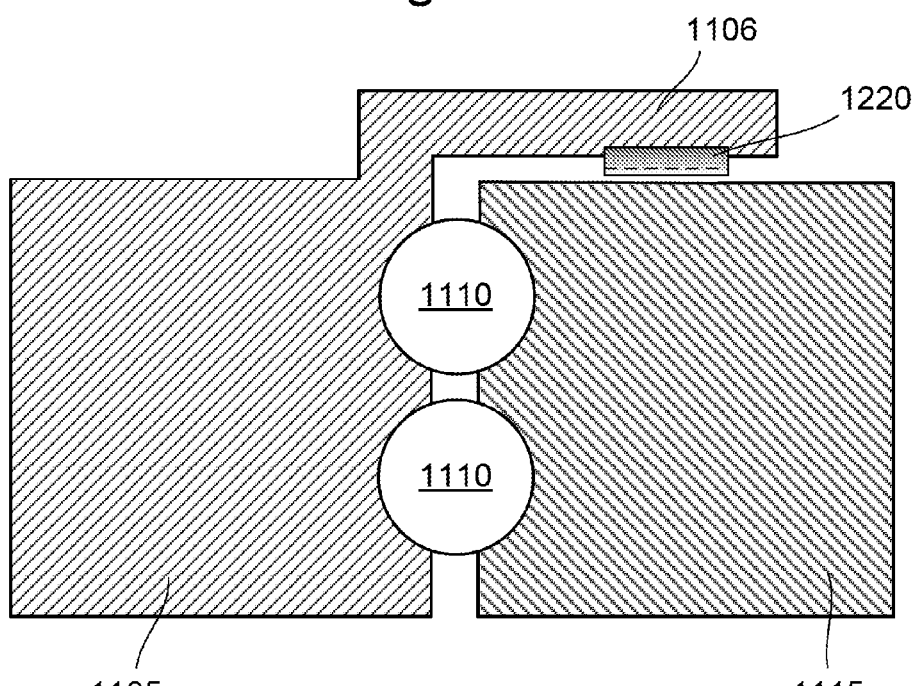
FIG. 12 is a cross-sectional illustration of a bearing according to yet another aspect of the present invention.

FIG. 12 illustrates another embodiment of the present invention, which incorporates a ribbon or spring 1220 (e.g., a ripple spring). In one embodiment of the present invention spring 1220 could be a thin metallic material formed into a "ribbon" or stamped into a wavy pattern. For example the thin metallic material could be a metal alloy such as a nickel-steel alloy. The "ribbon" or spring 1220 could have a non-linear load-deflection curve, which is soft at first, but then would provide a very high reaction after deflecting to a flatter configuration. As one example, the spring 1220 could be placed on extension 1106 and, if desired (but not required), a low friction material could be placed on an opposing surface. During extreme loads, at least a portion of the extreme loads are diverted away from rolling elements 1110 and directed from extension 1106, through spring 1220 to second race 1115. The spring 1220 can be designed to not contact second race 1115 during normal loads, so that little or no load is normally transferred from extension 1106 through spring 1220 to second race 1115. It is to be understood that spring 1220 could be attached to the extension 1106 and/or the second race 1115. The spring 1220 could also be made from one or more of metallic, sintered metallic, plastics, and reinforced plastic material.

The alternate load path may also comprise layers of lubricating material or a low friction material (e.g., Teflon®, a registered trademark of E. I. du Pont de Nemours and Company) on one or both of the load bearing surfaces. One or more load-bearing surface (during extreme loads) may also have material formed into specific shapes to help absorb the extreme loads. The sliding or rolling elements of the bearing may also be chosen from one or more of metallic, sintered metallic, plastics, reinforced plastic material.

In additional embodiments of the present invention, a first load path through the bearing can have a stiffness difference with a second load path. In one example, the first load path may have low friction, low load carrying capacity and a first stiffness level, whereas the second load path could have higher friction, higher load carrying capacity and a greater stiffness level (as compared to the first load path). The higher stiffness in the second load path could be obtained by having a shape or material difference between the two load paths. As one example, the second load path could include a low friction coating and/or a rippled material.

While the invention has been described in terms of various specific embodiments, those skilled in the art will recognize that the invention can be practiced with modification within the spirit and scope of the claims.

What is claimed is:

1. A bearing having a first race, a second race and one or more rolling elements, said bearing comprising:
   a load path for normal loads, the load path transmitting load from the first race through the one or more rolling elements to the second race; and
   an alternate load path for extreme loads, said alternate load path formed between said first race and said second race substantially bypassing the one or more rolling elements.

2. The bearing of claim 1, wherein a shoulder is formed on said first race, said shoulder forming a portion of said alternate load path.

3. The bearing of claim 1, wherein a shoulder is formed on said second race, said shoulder forming a portion of said alternate load path.

4. The bearing of claim 1, wherein at least one spacing element is arranged between said one or more rolling elements, said at least one spacing element forming a portion of said alternate load path.

5. The bearing of claim 4, wherein said at least one spacing element comprises a cage formed around at least a portion of said one or more rolling elements.

6. The bearing of claim 1 wherein said one or more rolling elements are chosen from at least one of the following group: a ball, a sphere, a roller, a tapered roller, a barrel shaped roller and a cylindrical element.

7. The bearing of claim 1, wherein said bearing is used as a pitch bearing in one or more blades of a wind turbine.

8. The bearing of claim 1, wherein said bearing is used as a yaw bearing between a nacelle and a tower of a wind turbine.

9. The bearing of claim 1, further comprising:
   at least one cavity formed in said first race;
   at least one projection formed on said second race, said at least one projection extending at least partially into said at least one cavity;
   wherein said alternate load path for extreme loads is formed between said first race, said at least one projection, said at least one cavity and said second race.

10. The bearing of claim 1, further comprising:
at least one shoulder formed on at least one of said first race and said second race, said at least one shoulder forming a portion of said alternate load path;
wherein said at least one shoulder is at least partially contained within a lubricating zone of said bearing.

* * * * *